Figure 1:
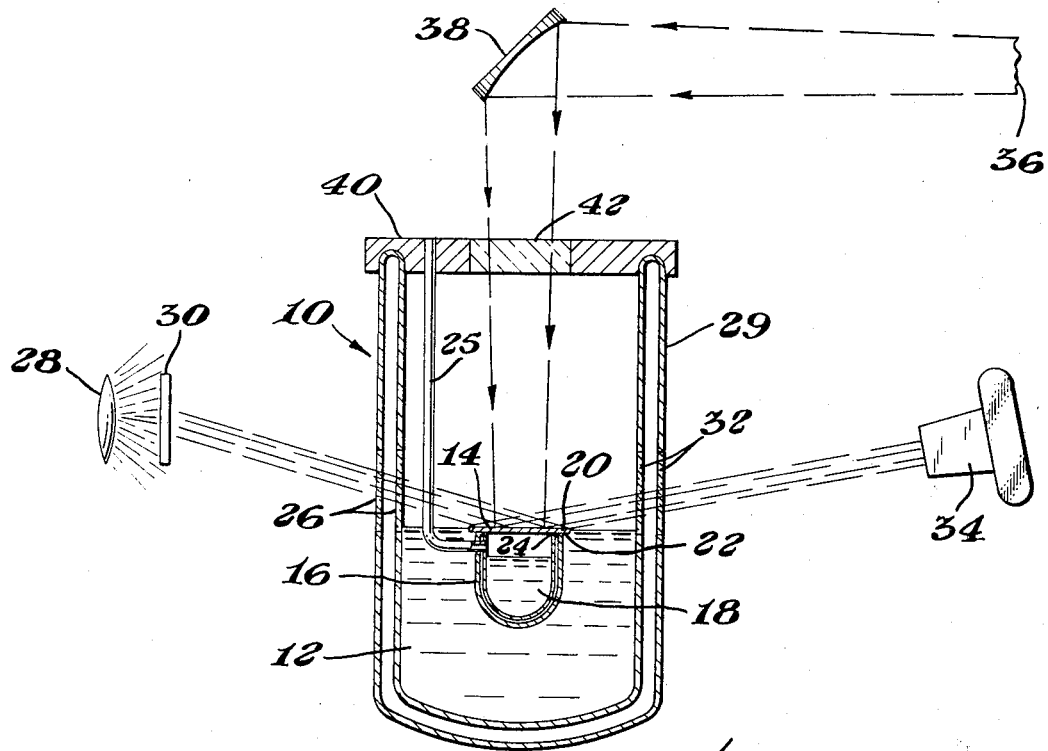

Nov. 5, 1968     L. B. BORST     3,409,773

INFRARED IMAGE DETECTOR USING CRYOGENIC LIQUID

Filed April 1, 1966

INVENTOR.
Lyle B. Borst
BY
C. Kenneth Bjork
AGENT

United States Patent Office 3,409,773
Patented Nov. 5, 1968

3,409,773
INFRARED IMAGE DETECTOR USING CRYOGENIC LIQUID
Lyle B. Borst, Buffalo, N.Y., assignor to The Dow Chemical Company, Midland, Mich., a corporation of Delaware
Filed Apr. 1, 1966, Ser. No. 539,345
10 Claims. (Cl. 250—83.3)

This invention relates to the detection of infrared radiation and more particularly is concerned with a novel apparatus for producing, observing and/or recording the image of an infrared object and to a method of its use.

Since conventional detectors of infrared irradiation of long wave length are primarily point detectors, to produce the geometric image of the infrared source ordinarily a system of scanning must be employed to obtain the image of an infrared object. This action is carried out, for example, by an oscillating mirror in combination with a fixed detector such as a thermistor, thermocouple, bolometer or other radiation detector which scans the image and produces a modulated current. This current is amplified and passed through a fast response glow tube such as an argon or neon filled lamp. The light is collimated and deflected in synchrony with the moving mirror thereby to give a scanned visible image which can be observed and/or preserved by photography.

Image orthicons are used with the shorter infrared wave length to convert a geometrical light pattern to a geometrical charge pattern which is scanned by an electrical beam. This electrical current can be amplified and transmitted to an image tube where a geometric image is displayed and recorded. The orthicon requires photons of sufficient energy to release electrons from the sensitive surface. Therefore, with this device there is no probability of achieving sensitivity of electromagnetic radiation beyond a few microns wave length.

Now, unexpectedly, the present invention provides a means for directly recording without amplification a focused infrared image of any wave length.

It is a principal object of the present invention to provide an infrared detector which has excellent resolving power and a method for its use.

Another object of the present invention is to provide an apparatus for observing the image of an infrared object which operates at low temperatures thereby reducing component heat capacity and thermal noise and which thereby exhibits high sensitivity.

It is also an object of the present invention to provide an infrared detector which can be used for both observing and/or recording the image of an infrared object.

A further object is to provide an improved infrared detector which has a primary amplification such that signal energy therefrom can control and modulate a larger energy flux.

Other objects and advantages of the present invention will become apparent from reading the detailed description thereof set forth hereinafter in conjunction with the accompanying drawing.

In the drawing:
FIGURE 1 presents schematically, partly in vertical section, one embodiment of an apparatus of the present invention.

Figure 2:
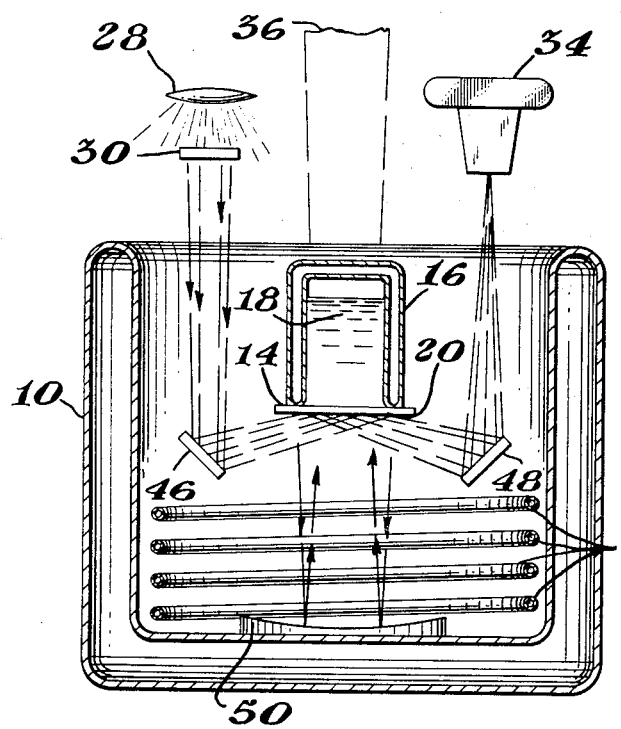

FIGURE 2 is a second embodiment also shown schematically, partly in vertical section, of the apparatus of the present invention.

The apparatus of the present invention for detecting infrared objects comprises a container, said container being capable of maintaining in the liquid state a cryogenic liquid having a boiling point below about 273° K. held in said container. A platen having a black surface is positioned in the container and the black surface of the platen is covered with a thin layer of a cryogenic liquid. Ordinarily this film is thicker than about 0.5 of the wave length of the visible or ultra-violet light energy striking it. A light source is placed so as to illuminate the cryogenic liquid film covered black surface of the platen and observing means are positioned to pick up light reflected from the surface of the film on the platen. Means are provided also for focusing an infrared image from an infrared source to be detected onto the low temperature cryogenic liquid film covered black surface.

Referring specifically to FIGURE 1 of the drawing which illustrates one embodiment of the apparatus of the present invention this comprises a container 10, e.g. of the Dewar vacuum type, holding a cryogenic liquid 12 therein. A black mat surface platen 14 is placed on a holder assembly 16 which defines a reservoir 18 for cryogenic liquid. The platen 14 is positioned such that its black mat surface 20 is approximately at the surface of the liquid 12. Conveniently the holder assembly 16 and platen 14 are fixed in position in container 10 such that the platen 14 is just above the level of liquid 12 in container 10. This assures that the temperature of the cryogenic liquid 12 within reservoir 18 of the holder assembly 16 is at substantially the same temperature as that of the liquid 12 surrounding the holder 16 in container 10. Formation of the film of cryogenic liquid 12 onto a black mat surface 20 of platen 14 is carried out by condensation of cryogenic liquid from the vapor phase or by contacting the undersurface 22 of platen 14 with liquid 12 within reservoir 18 and allowing this to creep onto the top surface 20 through capillary action by the joint 24 between the top of the reservoir 18 and bottom surface 22 of platen 14. In this latter embodiment the quantity of cryogenic liquid in the resrevoir 18 can be adjusted by means of conduit 25 connected to a cryogenic supply source (not shown).

Container 10 is provided with liquid tight ports or windows 26 above the surface of the cryogenic liquid. These windows are constructed of a material transparent to visible and ultra violet light waves. Light rays of short wave length and high actinic value, e.g. visible or ultra-violet radiation, from a light source 28 are directed onto the film wetted platen mat surface 20 of platen 14. Ordinarily, the light energy is passed through a collimator 30 before contacting the film. Windows 32 on the opposite side of vessel 10 are arranged to pass light from source 28 reflected from said black mat surface 20 to a light detecting means 34, e.g. an observing telescope, camera, other recording device or the like. The apparatus of cryogenic liquid container with platen in place therein is positioned such that the image of an infrared object 36 to be detected is directed onto the black mat surface 20 of platen 14. Ordinarily this image is focused by means of a reflecting optical system 38, e.g. a concave mirror, onto the film covered black mat surface 20. In actual practice, the container 10 ordinarily is covered with a top member 40 to aid in maintenance of the desired low temperature in the assembly. Conveniently, this top member 40 can contain a window 42 transmissive to the infrared radiation to be detected. Sodium chloride, potassium bromide, calcium fluoride and the like have been found to be satisfactory materials for use in preparation of optical window 42.

FIGURE 2 represents a second embodiment of the apparatus of the present invention wherein the platen 14 and holder assembly 16 unit is inverted when positioned within container 10. In this embodiment, the lower portion of the container 10 is not filled with cryogenic liquid. Rather a low temperature cooling coil 44, e.g. a coil containing liquid nitrogen, is positioned therein to provide a low temperature within this portion of the Dewar flask. Liquid nitrogen within the reservoir 18 of the platen holder 16 is controllably released therefrom. This condenses on the exposed top surface 20 of the platen 14. Light waves from light source 28 above the container 10 are passed through a collimator 30 onto a mirror 46 positioned within container 10 being passed from mirror 46 onto the film covered surface 20 of platen 14. These light waves are reflected from surface 20 to mirror 48 and directed by this mirror to detector 34. In this embodiment, usually the infrared source 36 to be detected is positioned above container 10 in a location such that the infrared radiation strikes mirror 50 in the bottom of the container 10 and is reflected from this mirror 50 onto the cryogenic liquid film on the platen 14.

Containers suitable for use in the apparatus of the present invention for holding the cryogenic liquid are those wherein there is substantially no heat loss through the walls. Dewar type vacuum flasks have been found to be suitable. Additional control of the temperature of the cryogenic liquid is assured by continuously circulating in closed circuit through the inner space between the walls of the Dewar flask quantities of the cryogenic liquid or a second cryogenic liquid having a temperature about that or colder than that of the liquid being employed. Further, utilizing the cooling effect achieved by evaporating small amounts of the cryogenic liquid as conventionally is practiced in the storage of liquid nitrogen, liquid ammonia, liquid oxygen and the like has been found to be a very effective way of maintaining the predetermined operating temperature in the cryogenic liquid contained in vessel 10.

Cryogenic liquids operable in the present invention are those having a boiling point below about 273° K. (0° C.). For optimum efficiency in the operation of the apparatus of the present invention, a low temperature cryogenic liquid having a boiling point below about 100° K. is employed to reduce component heat capacities and thermal noise. This liquid also preferably has a low heat capacity and low thermal conductivity. Liquid nitrogen, liquid oxygen, liquid methane and liquid helium have been found to be particularly suitable as cryogenic liquids for use in the practice of the present invention. Because of its extremely low boiling point, about 4° K., helium is an especially effective liquid for use in the practice of the present invention.

The black surfaced platen upon which the infrared image is focused can be any of a variety of useful materials including for example thin glass plates blackened with an evaporated metallic black coating, thin black glass having an etched surface, black plastic film, plastic films having black painted surfaces, black paper films or sheets, a block or thin sheet of charcoal or similar solid plate-like members having low thermal conductance and a blackened upper surface. Particularly effective embodiments are disordered thin solid films which exhibit low thermal conductance. Synthetic resin materials such as nylon, Teflon tetrafluoroethylene resins, Lucite acrylic resins, high density or expanded polystyrene, epoxy resins and the like in the form of a flat plate, the upper surface of which has been blackened by deposition of carbon black or some other mat producing black material have been found to be particularly effective.

A preferred embodiment of the present invention comprises a refrigerated container having liquid helium cryogenic liquid therein. A platen comprising a synthetic resin platen blackened by a deposit of carbon black and placed on a reservoir holder is positioned in the liquid helium. A continuous thin film of helium is formed on the black mat surface. An infrared image is focused onto the black mat surface by means of a reflecting optical system. Collimated visible light from a source is reflected through a predetermined angle, i.e. grazing angle, such that at least about 80 percent of that visible light directed onto the helium film is reflected to a light detecting means. Evaporation of the cryogenic liquid film from the black mat surface where the infrared image is focused from localized heating provides a darkened effect which in turn is sensed by the light detector.

In operation of the apparatus of the present invention, the black mat surfaced platen is refrigerated to a low temperature and the black mat surface is wetted by a continuous film of a cryogenic liquid. This black mat surface is positioned such that it is at the focal plane of an infrared image focused thereon. Usually, the infrared image is focused upon the mat surface of the platen by means of a reflecting optical system and passed through an optical window transmissive to the appropriate infrared radiation in the container holding the cryogenic liquid serving as coolant.

The film covered black mat surface is illuminated at a grazing angle by light of short wave length and high actinic value. The grazing angle is such that light is efficiently reflected from the film surface, i.e. better than about 50 percent reflection and preferably about 80 percent or more. This illuminating source ordinarily is provided by collimated visible light from a source ordinarily outside the system which is reflected through windows in the container onto the liquid film. A detecting or viewing telescope or camera is arranged so as to receive the reflected visible light from the film and thereby to permit examination of the liquid film or to record the image of the infrared source, this being defined since substantially no short wave radiation is reflected from the black surface remaining after evaporation of the film.

Although I do not mean to be bound by any particular theory or mode of operation of the present invention, generally it is understood that infrared radiation from the source to be detected which is focused onto the liquid film on the black mat surface is converted to heat energy thereon thereby raising the local temperature on the mat surface in the area covered by the infrared image. As the temperature rises, the liquid film evaporates at this point thereby exposing the mat surface to the illuminator. The flux of visible or actinic radiation striking the black mat surface is not reflected as compared to that striking the cryogenic film in the area not heated by the infrared radiation. Actually this visible or actinic radiation is converted to heat energy by absorption at the black surface thereby further warming the surface and inducing increased and a more rapid evaporation under the influence of the focused infrared image. The viewing telescope and/or camera thus records the infrared image as a dark area where light is no longer reflected from the film. The light source not only serves to further aid in increasing the sensitivity of the heated area of the platen but also provides the requisite light for photographing the image or observing it.

An advantage of the present invention resides in the fact that as increasing quantities of the liquid film are evaporated from the platen surface continuous observation or sequential photographs of the surface can be taken thereby not only identifying the infrared object but also producing through sequential photographs, i.e. time lapse photography, an animated effect which shows the formation of the image on the platen surface.

The following example will serve to further illustrate the present invention but is not meant to limit it thereto.

An apparatus similar to that shown in the FIGURE 1 and described hereinbefore was assembled. This consisted of a container about 3 inches in diameter and about 2 feet long made up of two concentric Dewar vacuum flasks. This container had several glass windows transparent to actinic and ultraviolet light positioned in its side walls. A platen consisting of black tape recorder film was positioned in the container. Liquid nitrogen was introduced into the container up to a level such that the platen mat surface was at about the upper level of the liquid nitrogen. A continuous film of liquid nitrogen was maintained on the black upper surface of the platen by capillary action from a liquid nitrogen supply in the reservoir of the platen holder.

Infrared radiation from a 1000 watt electrical lamp bulb was projected and focused through a concave front surface mirror onto the black surface of the platen. A point arc visible light source and collimator outside of the side wall of the liquid nitrogen container was positioned such that collimated light was directed onto the black surface and reflected therefrom through a second set of windows and picked up by a camera. The grazing angle of the light was such that reflected light from the film was greater than 80 percent of the visible radiation used to illuminate the film surface and platen. Photographs taken of the platen surface showed a darkened area where the liquid nitrogen had evaporated. In shape this darkened area corresponded to the outline of the image of the 1000 watt bulb.

In other studies using this same general apparatus, a flat resin film platen having carbon black deposited thereon produced the same effect, i.e. the image of the bulb was formed on the photographic film.

In these studies it was noted that the time lapse before the appearance of the image at a maximum was only about 0.5 second from the time the infrared was first focused onto the cryogenic film on the black surfaced platen. This indicates that the apparatus of the present invention not only is applicable for detecting stationary objects but also can be used to detect slow moving infrared radiators.

Various modifications can be made in the present invention without departing from the spirit or scope thereof for it is understood that I limit myself only as defined in the appended claims.

I claim:

1. An apparatus for detecting infrared objects which comprises a container, said container being capable of maintaining in the liquid state a cryogenic liquid having a boiling point below about 273° K., a platen having a black surface positioned in said container, said black surface of said platen being covered with a thin layer of a cryogenic liquid having a boiling point below about 273° K., a light source positioned such that the cryogenic liquid film covering the black surface of said platen is illuminated, observing means positioned to pick up light reflected from the surface of the film on said platen, and means for focusing an infrared image from an infrared source to be detected onto said cryogenic liquid film covering said black surface of said platen.

2. The apparatus as defined in claim 1 wherein the platen is placed on a holder assembly, said holder assembly defining a reservoir for a cryogenic liquid and means for providing a liquid film of cryogenic liquid from said reservoir on the surface of said platen.

3. The apparatus as defined in claim 1 wherein the black surfaced platen is a plate like member having a low thermal conductance and having a black mat surface.

4. The apparatus as defined in claim 3 wherein the platen comprises a synthetic resin platen, the surface of which has been blackened by a deposit of carbon black.

5. The apparatus as defined in claim 1 wherein the container holding said platen is provided with windows in its side-walls, said windows being transparent to short wave radiation selected from the group consisting of visible or actinic light rays, said windows being positioned to transmit light from said light source onto said film of cryogenic liquid on the black surface of said platen and to pass reflected light from said liquid surface to said detecting means.

6. A method for detecting an infrared source which comprises:
 (a) covering a black surfaced flat platen with a thin film of a cryogenic liquid, said liquid having a boiling point of below about 273° K.,
 (b) focusing an infrared image from an infrared source to be detected onto the low temperature cryogenic liquid film covered black surface of said platen thereby to convert the infrared radiation focused onto said liquid film to heat energy, said heat energy raising the local temperature on the black surface of said platen in the area defined by said infrared image and evaporating the liquid film in said area thus exposing the substantially non-reflecting black surface of said platen,
 (c) illuminating said cryogenic liquid film with light rays of short wave length and high actinic value and reflecting said light rays from said film to an observing means, and
 (d) noting the reflected light rays and thus the image of said infrared source by said observing means.

7. The process as defined in claim 6 wherein the light rays of short wave length and high actinic value strike the cryogenic film on the black surface of said platen at an angle such that there is greater than about 50 percent reflection of said light rays therefrom.

8. The process as defined in claim 7 and including the step of collimating the short wave length high actinic value light rays prior to directing these onto the liquid cryogenic film on the black surface of said platen.

9. The process as defined in claim 7 wherein the light rays of short wave length and high actinic value strike the cryogenic film on the black surface of said platen at an angle such that there is greater than about 80 percent reflection of said light rays therefrom.

10. The process as defined in claim 6 wherein the cryogenic liquid has a boiling point below about 100° K.

References Cited

UNITED STATES PATENTS

| | | | |
|---|---|---|---|
| 2,855,522 | 10/1958 | Robinson et al. | 250—83.3 |
| 2,973,434 | 2/1961 | Roberts | 250—83 |
| 3,114,836 | 12/1963 | Fergason et al. | 250—83 |
| 3,153,724 | 10/1964 | Demorest | 250—83.3 |
| 3,253,086 | 5/1966 | Cambell | 350—161 X |

RALPH G. NILSON, *Primary Examiner.*

S. ELBAUM, *Assistant Examiner.*